(12) United States Patent
Walter et al.

(10) Patent No.: US 11,927,936 B2
(45) Date of Patent: Mar. 12, 2024

(54) SAFE OPERATION OF A MULTI-AXIS KINEMATIC SYSTEM

(71) Applicant: Siemens Aktiengesellschaft, Munich (DE)

(72) Inventors: Maximilian Walter, Nuremberg (DE); Dominik Budday, Erlangen (DE); Minh Le, Bernburg (DE); Alexander Stein, Veitsbronn (DE); Sören Burmeister, Fürth (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 17/691,316

(22) Filed: Mar. 10, 2022

(65) Prior Publication Data
US 2022/0291655 A1 Sep. 15, 2022

(30) Foreign Application Priority Data
Mar. 11, 2021 (EP) .................................... 21162017

(51) Int. Cl.
*G05B 19/406* (2006.01)
*G05B 19/4155* (2006.01)

(52) U.S. Cl.
CPC ....... *G05B 19/406* (2013.01); *G05B 19/4155* (2013.01); *G05B 2219/39051* (2013.01)

(58) Field of Classification Search
None
See application file for complete search history.

(56) References Cited

U.S. PATENT DOCUMENTS

| 2007/0046677 A1* | 3/2007 | Hong ..................... G05B 19/41 345/442 |
| 2019/0262993 A1 | 8/2019 | Cole et al. |
| 2022/0288773 A1* | 9/2022 | Walter ..................... B25J 9/023 |

FOREIGN PATENT DOCUMENTS

DE 102005011143 A1 9/2006

* cited by examiner

*Primary Examiner* — Ryan A Jarrett
(74) *Attorney, Agent, or Firm* — Lempia Summerfield Katz LLC (57) ABSTRACT

A method and an associated controller for safely operating a multi-axis kinematic system by using a safety function are disclosed. The method includes calculating compensation values at the run time of a controller of the multi-axis kinematic system, wherein the calculation is performed based on predefinable error values of respective axes, geometric parameters of the multi-axis kinematic system, and current axis values of the multi-axis kinematic system. The method further includes operating the safety function based on the calculated compensation values.

16 Claims, 3 Drawing Sheets

SAFE OPERATION OF A MULTI-AXIS KINEMATIC SYSTEM

The present patent document claims the benefit of European Patent Application No. 21162017.4, filed Mar. 11, 2021, which is hereby incorporated by reference in its entirety.

TECHNICAL FIELD

The disclosure relates to a method and a controller for safely operating a multi-axis kinematic system by using a safety function.

BACKGROUND

In modern production installations and factories, increasing use is being made of robots, handling systems, cranes, etc., or, in general, multi-axis kinematic systems in a wide variety of embodiments. It is essential for the safety of the operation of such multi-axis kinematic systems in installations that safety-oriented monitoring of the kinematic system or parts of the kinematic system may be implemented. Safe operation of multi-axis kinematic systems is necessary in this case to avoid collisions with objects in the surroundings of the multi-axis kinematic system and in particular to avoid dangerous accidents when there are human beings in the surroundings of the multi-axis kinematic system.

For this reason, controllers of robots or manipulators may include monitoring functions, such as for example a monitoring system for a Cartesian speed of a point. The latter involves calculating a Cartesian speed of a point, (e.g., an articulation or the tool center point), from safe axis positions. A check is then performed to determine whether a parameterization of the speed limit has been exceeded. Exceeding is indicated by a safe output.

Similarly, safe zone monitoring is known, which involves a position and an orientation of moving kinematic system zones, (e.g., cuboids or spheres), being calculated from safe axis positions. The zones are parameterized such that they contain the moving parts of the kinematic system completely, forming so-called enveloping bodies. A check is then performed for each kinematic system zone to determine whether it leaves a previously defined, fixed operating space zone or whether it overlaps at least one previously defined, fixed protection zone. The leaving of the operating space or an overlap with protection zones is indicated using safe outputs.

Furthermore, the function of monitoring a safe orientation is known. The orientation of a previously stipulated axis, for example an orientation of a blade mounted at the tool center point, is calculated from safe axis positions. This orientation is compared with a setpoint value and the difference is output at a safe output.

An end user may connect up the safe outputs to functions that activate a suitable safety reaction, for example initiate stopping of a machine or activate a speed restriction.

Safe monitoring is normally based on safe positions of the individual axes as the basis for the output and, if necessary, the initiation of a safety reaction. The positions of the individual axes may be ascertained only with a specific accuracy deviation. Sensor values are erroneous in practice. Such errors need to be reproduced by the safety function. Inaccuracies also arise as a result of inertias and run-on distances caused thereby.

Known conventional statistical error calculation, (e.g., based on guide of uncertainty in measurements (GUM) methods), does not make satisfactory allowance for the errors that occur, because mean deviations are calculated here, rather than a worst-case deviation.

It is furthermore known practice to use merely general correction values without knowledge of the specific kinematic system that is in use, with its data and the quality of the sensors used. The specification of general correction values of this kind needs to be very conservative for safety-oriented operation, which means that the availability of the multi-axis kinematic system may be unnecessarily reduced during use.

SUMMARY AND DESCRIPTION

Against this background, it is an object of the present disclosure to improve allowance made for errors, (e.g., error values attached to sensor output data, or run-on distances), during the safe monitoring of multi-axis kinematic systems.

The scope of the present disclosure is defined solely by the appended claims and is not affected to any degree by the statements within this summary. The present embodiments may obviate one or more of the drawbacks or limitations in the related art.

The disclosure relates to a method for safely operating a multi-axis kinematic system by using a safety function, the safety function being based on respective axis positions of respective axes of the multi-axis kinematic system. The method includes calculating compensation values at the run time of a controller of the multi-axis kinematic system, wherein the calculation is performed based on predefinable error values of respective axes, geometric parameters of the multi-axis kinematic system, and current axis values of the multi-axis kinematic system. The method further includes operating the safety function based on the calculated compensation values.

While the multi-axis kinematic system is operating, (e.g., while performing movement tasks), at least one safety function is activated. By way of example, multiple safety functions are active, for example, safe zone monitoring, safe speed monitoring, and the safe monitoring of an orientation. As a rule, multiple variables are monitored by a safety function during operation, for example, the positions of multiple moving axes, and for example, furthermore, positions and speeds of each of multiple moving axes.

The safety function uses positions of its various axes as input data. Safety during operation is therefore dependent not only on the safety function operating correctly but also on the accuracy of the input data. The respective axis positions are provided to the safety function by respective axis sensors or axis transducers. Because the sensors or transducers may only operate with finite accuracy, positions are erroneous. Furthermore, safety is also dependent on allowance being made for axial run-on distances on the basis of inertias. It is assumed below that error values of the various axes involved are known.

The error values are the error values that are relevant to a specific application or a specific design or a specific installation using the multi-axis kinematic system, which error values may be sensor resolutions, run-on distances, etc. An error value is relevant if it is necessary to make allowance for it in order to apply a safety function, for example, because it affects the actual position, speed, or orientation that is monitored. An error value exists if there is a deviation between the actual position, speed, or orientation of the segments of the multi-axis kinematic system and positions, speeds, or orientations that are reported by sensors, or setpoint positions, setpoint speeds, or setpoint orientations that are predefined based on control commands.

The known error values, (e.g., maximum error values), are stored in the system, (e.g., a control system), such as in a configuration phase of the multi-axis kinematic system. During operation, the safety function may resort to the stored error values.

Similarly, the geometric parameters of the multi-axis kinematic system are stored, for example, in a configuration phase.

While the multi-axis kinematic system is operating, the system travels along trajectories that, by way of example, have been determined in advance or are stipulated at the run time, for example, based on camera data. The axes that are involved each successively adopt various attitudes that are predefined or optimum based on the trajectory. Based on the various attitudes adopted during operation while taking one or more trajectories, the respective error values contribute to the compensation value in different ways or in different combinations. Owing to error propagation effects, allowance needs to be made, depending on the attitude of the multi-axis kinematic system, for an individual compensation value for the variable that is to be monitored by the safety function.

By way of example, different deviations in respective positions or speeds or orientation of the axes involved occur for every trajectory for every axis over the course of movement along the trajectory on account of the error propagation. By way of example, different deviations between actual position and setpoint position arise for every trajectory for every axis on the basis of axial run-on distances in the case of a safety reaction, such as a safe stop. Furthermore, the axial run-on distances vary depending on a speed profile or depending on masses of the kinematic system.

To calculate the compensation value, in particular, the respective current maximum compensation value to be expected is ascertained for a variable of the safety function. This maximum possible error for the specific kinematic system and for a specific position or attitude of the kinematic system is ascertained continuously at the run time and is used directly in the safety function.

The ascertained compensation values are error values for which allowance needs to be made for every axis or for every segment, for example. Maximum lengths by which monitoring zones need to be enlarged for every segment, or maximum speed absolute values by which intended Cartesian speed limits need to be reduced, may therefore be ascertained for operation, for example. Furthermore, the ascertained compensation values may be used to enlarge static zones that apply to the whole kinematic system in the case of protection zones or to reduce them in the case of operating zones.

The ascertained compensation values correspond to maximum expected values of variables to be monitored that compensate for the possible errors that occur.

By way of example, when ascertaining the compensation values, allowance is also made for numerical errors that may arise as a result of approximative algorithms, iterative methods, roundings, for example, in floating-point or fixed-point arithmetic.

In a snapshot of the multi-axis kinematic system during operation, a compensation value is obtained for which allowance is made in order to compensate for a variable of the safety function, (e.g., a position, speed, or orientation), in such a way that allowance is made for inaccuracies based on maximum possible deviations. At the same time, this compensation value calculated using the proposed method is not selected unnecessarily, (e.g., unnecessarily pessimistically), because the specific kinematic system and the specific attitude of the kinematic system in a snapshot are used for calculating the compensation value. In the course of operation, the current compensation value is in each case calculated for snapshots that are at arbitrary intervals of time. By way of example, the compensation values are calculated at the rate at which the sensors provide values relating to the axis positions. The multi-axis kinematic system is therefore operated with at least one activated safety function based on the calculated compensation values.

Depending on what masses, inertias, and speeds prevail on axes, the compensation effects based on axial run-on distances or sensor resolutions may be predominant. Advantageously, both effects are ascertained, and allowance is ultimately made for the resulting maximum compensation values.

Advantageously, during operation, the safety function is therefore firstly operated in due consideration of sufficiently large compensation values, and secondly an excessively pessimistic estimation that would be obtained irrespective of the current axis values or irrespective of the geometric parameters is eliminated.

According to one configuration, sensor resolutions are used as the error values of respective axes. The axis sensors may be transducers provided on the respective axes. The error values provided may be maximum sensor errors that are possible for every axis sensor. Ascertaining the compensation value based on the sensor resolutions and the geometric parameters of the multi-axis kinematic system and the axis values of the respective axes that are obtained from trajectories of the multi-axis kinematic system allows safe operation of the multi-axis kinematic system, in which, in the course of operation of the kinematic system, the variables of safety functions, (e.g., safety zone variables), are afforded sufficiently large proportions in due consideration of the compensation value, and at the same time does not necessitate excessively pessimistic allowance being made for sensor errors.

According to one configuration, axial run-on distances are used as the error values of respective axes. The run-on distances may be dependent on the effective axis inertia or axis load or on the axis speed. By way of example, the run-on distances in the worst case are known and are stored for every axis, (e.g., in table form), and are additionally stored based on axis properties, for example.

In particular, axis properties such as inertia and speed are known at the run time and are used for calculating or calling a respective error value, which means that a compensation value is ascertained in such a way as to be up to date for the run time. By way of example, the predefining of a limited speed leads to a shorter run-on distance for the respective axis. As such, automatic or dynamic ascertainment and adaptation of the compensation value may be effected based on a dynamically variable error value.

By way of example, a variable of a safety function, (e.g., a safety zone variable), is adapted so that safety reactions, (such as a safe stop), are also reliably performed in due consideration of the run-on distances. Advantageously, and in particular in addition to the allowance made for sensor resolutions, allowance is therefore made during operation for uncertainties and deviations from setpoint values that occur during operation after a safety reaction is initiated.

According to one configuration, the safety function is dynamically adapted, in particular by adapting variables of the safety function during the run time. The safety function therefore dynamically makes allowance for the respective currently applicable and necessary compensation values. By way of example, during operation, the safety function for safe zone monitoring performs a comparison of an ascertained position, for example the position of individual points of individual segments of the multi-axis kinematic system, against zones that the segment or respective points of the respective segment must not leave, and in so doing extends the zones by the current compensation values. Therefore, only the minimum required and at the same time maximum possible compensation is performed. Similarly, for example a speed to be monitored is compared against a speed limit value absolute value that is continuously reduced by the respective current compensation value.

The error values and also the geometric parameters and the current axis values of the multi-axis kinematic system are used to ascertain the compensation value, and the safety function then makes allowance for the compensation value for one or more variables of the safety function, depending on the intended safety function. If there is provision for zone monitoring, for example, the position error that arises for the different segments of the kinematic system and an orientation error, (e.g., of the end effector), are ascertained. Both error values act as a compensation value for the variables that are monitored by the safety function, in this example for the dimensions of zones. This adaptation may be performed by the safety function at the run time.

By way of example, the adaptation performed is documented by the safety function. If there is provision for speed monitoring, a speed error is calculated for multiple monitoring points based on the position errors thereof, and the speed error is taken into account when setting up a limit speed. Furthermore, an ascertained orientation error may be used for orientation monitoring and may reduce a limit angle by the appropriate error absolute value.

According to one configuration, the safety function is operated by using a comparison, which takes place at the run time, with compensation values ascertained in a configuration phase, and a safety reaction is initiated when the compensation values calculated at the run time and the compensation values ascertained in the configuration phase are below respective stipulable deviation limit values.

By way of example, compensation values are estimated in a configuration phase and are stored in a safety function module. By way of example, the compensation values are estimated by virtue of maximum error values and geometric parameters of the multi-axis kinematic system already being known in the configuration phase, and later current axis values being estimated on the basis of axis attitudes to be adopted by the multi-axis kinematic system. By way of example, trajectories from which the axis attitudes to be adopted during operation are deduced are known.

Current compensation values to be expected during later operation are therefore ascertained in the configuration phase. The compensation values estimated during the configuration are used statically and are compared at the run time with the calculated compensation values for which allowance actually needs to be made. If the actually required values exceed the estimated values, a suitable safety reaction is triggered, for example, a safe stop.

Advantageously, the estimated compensation value does not necessarily have to make allowance for the theoretically worst case. It suffices to specify a value that has a high likelihood of not being exceeded. This limit does not need to be justified in terms of safety engineering, because exceeding it does not lead to a dangerous state.

The method may therefore advantageously be used even if dynamic adaptation of variables of the safety functions during operation, (e.g., of limit values), is not possible.

According to one configuration, the respective error values and/or the geometric parameters are provided in a configuration phase that is at a time before the run time. Advantageously, the safety function is therefore set up in the configuration phase. Furthermore, later adaptations are also possible.

According to one configuration, the respective error values and/or the geometric parameters are provided or changed at the run time. Advantageously, it is therefore possible to react to changes in a design, for example, a hardware replacement. Therefore, besides inputs of the safety function, such as in particular active zones and axis values, it is cyclically also possible to use respective error values and geometric parameters that are updated at the run time.

According to one configuration, the current axis values are obtained from trajectories that are to be traveled along by the multi-axis kinematic system, and during the run time for the axis attitudes that are adopted at successive times as a result of the trajectories that are to be traveled along. Advantageously, only the axis attitudes that are actually adopted are used for operating or adapting the safety functions. In particular in the case of setups that allow a trajectory to be taken using different axis attitudes of the multi-axis kinematic system, safety monitoring designed for the specific operation is rendered possible.

According to one configuration, the compensation values ascertained in a configuration phase are estimated or are ascertained during a test run. Advantageously, for scenarios in which the safety function is not dynamically adaptable, ongoing operation may be emulated in a configuration phase already and the compensation values may be estimated or may be ascertained by a test run.

If the multi-axis kinematic system is later operated in line with the trajectories assumed in the configuration phase, the safety function may resort to the ascertained values from the configuration phase. Moreover, the compensation values actually required are calculated during operation and are compared with the estimated or previously ascertained compensation values.

According to one configuration, the safety function includes safe zone monitoring, a safe orientation, and/or a safe Cartesian speed. The safe zone monitoring results in zones that surround or envelop moving sections of the kinematic system being predefined. The safe axis positions may be used to infer the position and orientation of these zones.

The ascertained zones are then examined for whether they leave the operating space zones defined for the kinematic system. If such a state is detected, a safety function is triggered, which may be a safe stop or a reduced speed, for example. Similarly, collision monitoring takes place using protection zones defined in the operating environment of the kinematic system, and a safety function is triggered if the two zones overlap, that is to say the kinematic system zone overlaps the protection zone.

Advantageously, it is therefore possible to make allowance for at least required axial run-on distances or erroneous positions on the basis of limited sensor resolutions, in order to initiate a safety reaction in good time, so that safe operation is provided. By way of example, the zone monitoring is configured, and in particular the zone size is dimensioned, in such a way that even when a safety reaction has been triggered, (e.g., a safe stop), the operating space zone is not left or an overlap with a protection zone is prevented.

According to one configuration, angle absolute values, zone dimension absolute values, and/or speed absolute values, which are variable with the run time and in particular are in each case current, are ascertained as compensation values. The compensation value may therefore be ascertained in order to carry out compensation, which takes place at the run time, for variables that are used by the safety function in order to monitor when specific limit values are exceeded or fallen short of in due consideration of the continuously variable and in each case current circumstances. By way of example, positions of axes or angles or orientations of axes and therefore, for example, of tools or other parts on the end effector are complemented by the associated compensation value.

The compensation value is advantageously already the value by which the safety function is adapted without further calculations. By way of example, it is directly a length by which monitoring zones need to be enlarged. By way of example, it is angles for which allowance needs to be made in the safety function Safe orientation in order to reliably compensate for the axis errors.

Furthermore, it is speed absolute values by which speed limit values that must not be exceeded need to be reduced, for example. In the case of speed limit values, speeds may be calculated based on at least two axis positions, and the limit value needs to be set lower in due consideration of the errors and the propagation thereof.

According to one configuration, the safety function is further operated on the basis of a timing error for the scanning of respective axis sensors over time. Allowance may therefore be made for an offset in the scanning over time, and hence further inaccuracies of the axis sensors besides sensor resolutions. By way of example, besides the maximum errors of the axis sensors, (e.g., 1°), the maximum error in the scanning over time, (e.g., 1 ms), is also specified for each axis. An additional position error may be ascertained from the error in the scanning over time by using the current speed of this axis, (e.g., 2°/ms). In the example given, this is 1 ms*2°/ms=2°. This may be added to the sensor error in order to obtain the total error in the input values. In the present case, an error of 1°+2°=3° is obtained in total.

The disclosure further relates to a control device for safely operating a multi-axis kinematic system, having a safety function block, the safety function block initiating safety reactions based on respective positions of respective axes of the multi-axis kinematic system. The control device includes a compensation block for calculating compensation values at the run time of a controller of the multi-axis kinematic system. The compensation block has inputs for error values of respective axes, for geometric parameters of the multi-axis kinematic system, and for current axis values of the multi-axis kinematic system. Additionally, the compensation block has outputs for compensation values, wherein the safety function is configured to initiate safety reactions based on the output compensation values.

Advantageously, using the method described above or the control device described above for a specific subject area results in the smallest possible compensation values, which at the same time nevertheless sufficiently reliably makes allowance for errors in the input values, such as sensor resolutions and axial run-on distances. It is therefore possible to operate closer to zones or speed limits with the specific kinematic system during safe operation. This advantageously leads to higher performance or availability of the kinematic system. Unnecessarily pessimistic estimations of error values are eliminated.

BRIEF DESCRIPTION OF THE DRAWINGS

The disclosure is explained more thoroughly below on the basis of exemplary embodiments with the aid of the figures, in which.

DETAILED DESCRIPTION

Figure 1:
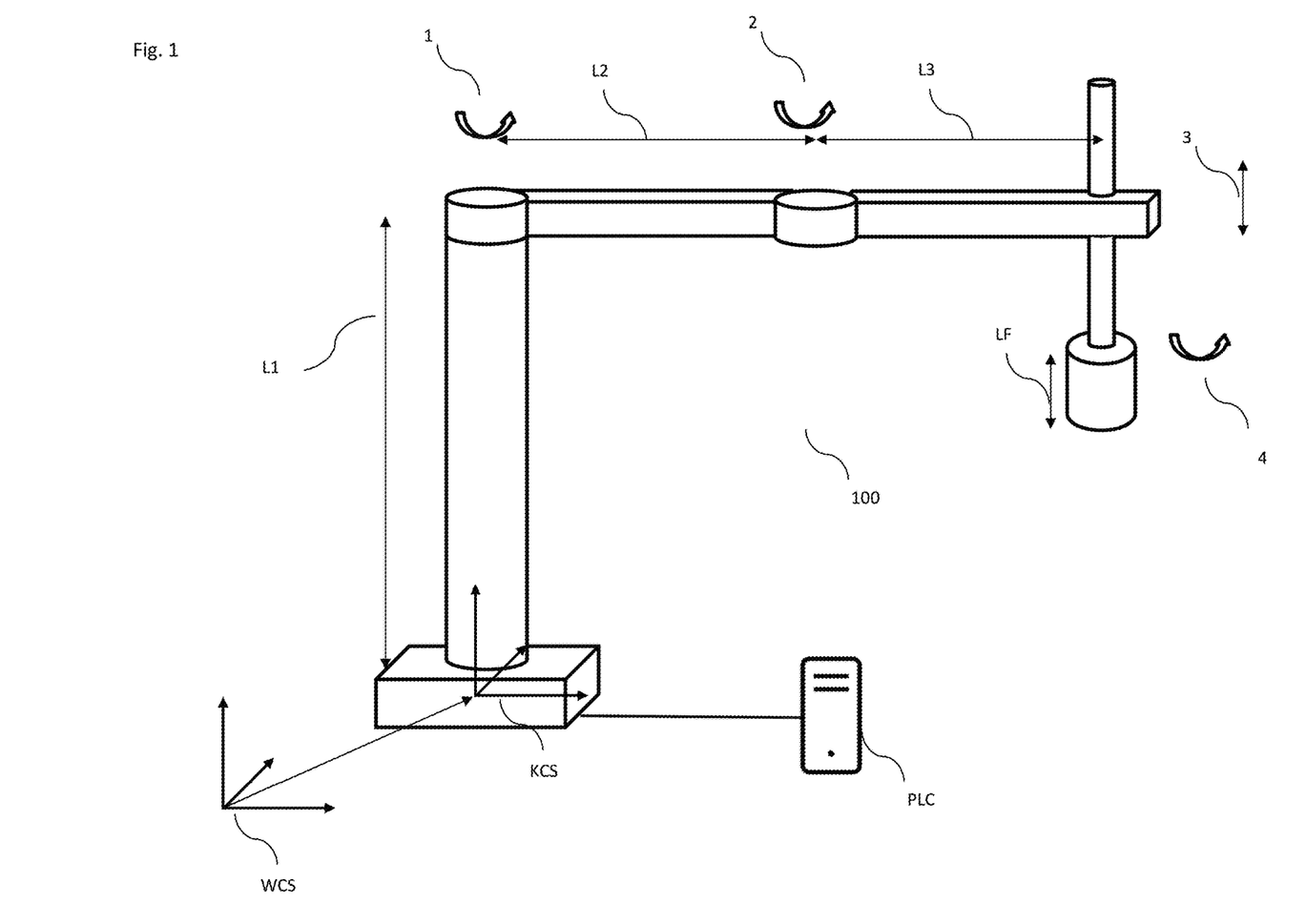
FIG. 1 depicts a schematic representation of a multi-axis kinematic system during operation according to a first exemplary embodiment.

FIG. 1 schematically depicts a multi-axis kinematic system 100 with a kinematic system coordinate system KCS referenced to the kinematic system and a world coordinate system WCS of the surroundings. There is provision for a first axis 1 as a rotary axis, which is situated at the end of a first segment L1, the alignment of which coincides with that of a vertical axis of the kinematic system coordinate system.

A user inputs the length of the first segment L1, and also the length of the second segment L2 and the length of the third segment L3, as geometric parameters of the multi-axis kinematic system 100. The second segment L2 starts from the first rotary axis 1 and is connected to the third segment L3 by way of a further rotary articulation, which forms the second axis 2. There is moreover provision for a lifting axis 3 on the third segment, which may be moved vertically. Finally, a last axis 4 is set up as a rotatable axis, which at the same time forms a flange having the dimension LF, for example.

The user also predefines the following transducer errors as maximum error values:
transducer error F1 axis 1: $1/10°$
transducer error F2 axis 2: $1/10°$
transducer error F4 axis 4: $1/10°$
transducer error F3 axis 3: 1 mm The errors in the input angles and the input parameters propagate to the calculated position of the flange as follows and produce a Cartesian position error Fpos of the flange:

$$Fpos=Fa1+Fa2+Fa3$$

where Fa1, Fa2, Fa3 are the error contributions of the axes 1, 2, 3, which all add up.

The following derivation may be used for the error contribution Fa2:

Let there be a position vector v, which is rotated about an angle α. An angle deviation of $e_\alpha$ leads to a position error $F=\|v-v'\|$ of no more than $$2*\sin\left(\frac{e_\alpha}{2}\right)*\|v\|.$$

If α is specified in degrees, it holds that $$F < 2*\sin\left(\frac{e_\alpha * 2\pi}{2*360}\right)*\|v\|.$$

This is true because the incorrect position v' and the correct position v and also the center of rotation form an isosceles triangle with acute angle $e_\alpha$.

In vector terms, the following is therefore obtained for Fa2 on the basis of the axis values a1 and a2:

$$Fa2 = 2*\sin\left(\frac{F2*\pi}{360}\right)*L3*\begin{pmatrix}|\sin(a1+a2)|\\|\cos(a1+a2)|\\0\end{pmatrix}$$

The error contribution Fa1 is obtained analogously as:

$$Fa1 = 2*\sin\left(\frac{F1*\pi}{360}\right)*\left(L2*\begin{pmatrix}|\sin(a1)|\\|\cos(a1)|\\0\end{pmatrix}+L3*\begin{pmatrix}|\sin(a1+a2)|\\|\cos(a1+a2)|\\0\end{pmatrix}\right)$$

In this case, the superposition principle is used for multiple erroneous inputs to add the values in the outputs.

The error contribution Fa3 of (linear) axis 3 is used directly in the z component of the total position error:

$$Fa3 = \begin{pmatrix}0\\0\\F3\end{pmatrix}$$

Additionally, an absolute value estimation may take place across all possible axis input values, which means that the following is obtained for the example indicated:

$$\|F_{pos}\| \leq \|Fa1\| + \|Fa2\| + \|Fa3\| \leq 2*\sin\left(\frac{100*\pi}{360000}\right)*(600 \text{ mm}) +$$

$$2*\sin\left(\frac{100*\pi}{360000}\right)*(300 \text{ mm}) + 1 \text{ mm} = 2.570796 \text{ mm}$$

Because safe zone monitoring is supposed to be active for the kinematic system depicted by way of illustration, for example, a Scara robot, the radii or cuboid half-lengths of intended kinematic system protection or operating spaces are adapted using the value Fpos. For higher accuracy requirements, the individual half-lengths may also be individually adapted in due consideration of the relevant axis attitudes.

Additionally, a safety function is also set up that reliably monitors the orientation of the flange.

Errors propagate from the error contributions F1, F2, F4 to the calculated orientation in an unaltered manner. In the worst case, the error $F_{rot}$ is therefore obtained for the given kinematic system values:

$$Frot = \frac{100° + 100° + 100°}{1000} = \frac{300°}{1000}$$

The compensation value Frot is also used by the monitoring function to perform an adaptation of the limit value. In this case, the spherical segment within which the orientation of the flange must be situated in order for no safety function to be initiated is reduced at the run time as appropriate.

If speed monitoring is additionally active as a safety function, the speed of a point is obtained analogously from the result of the vector subtraction from the most recently calculated position and a current position in due consideration of the time that has elapsed. Allowance is accordingly made for the errors additively for the worst case in order to adapt the limit speed as appropriate.

The three compensation values shown by way of illustration are each ascertained continuously, (e.g., in a constantly up-to-date manner), in the course of operation and the safety function is adapted in the controller PLC accordingly.

Figure 2:
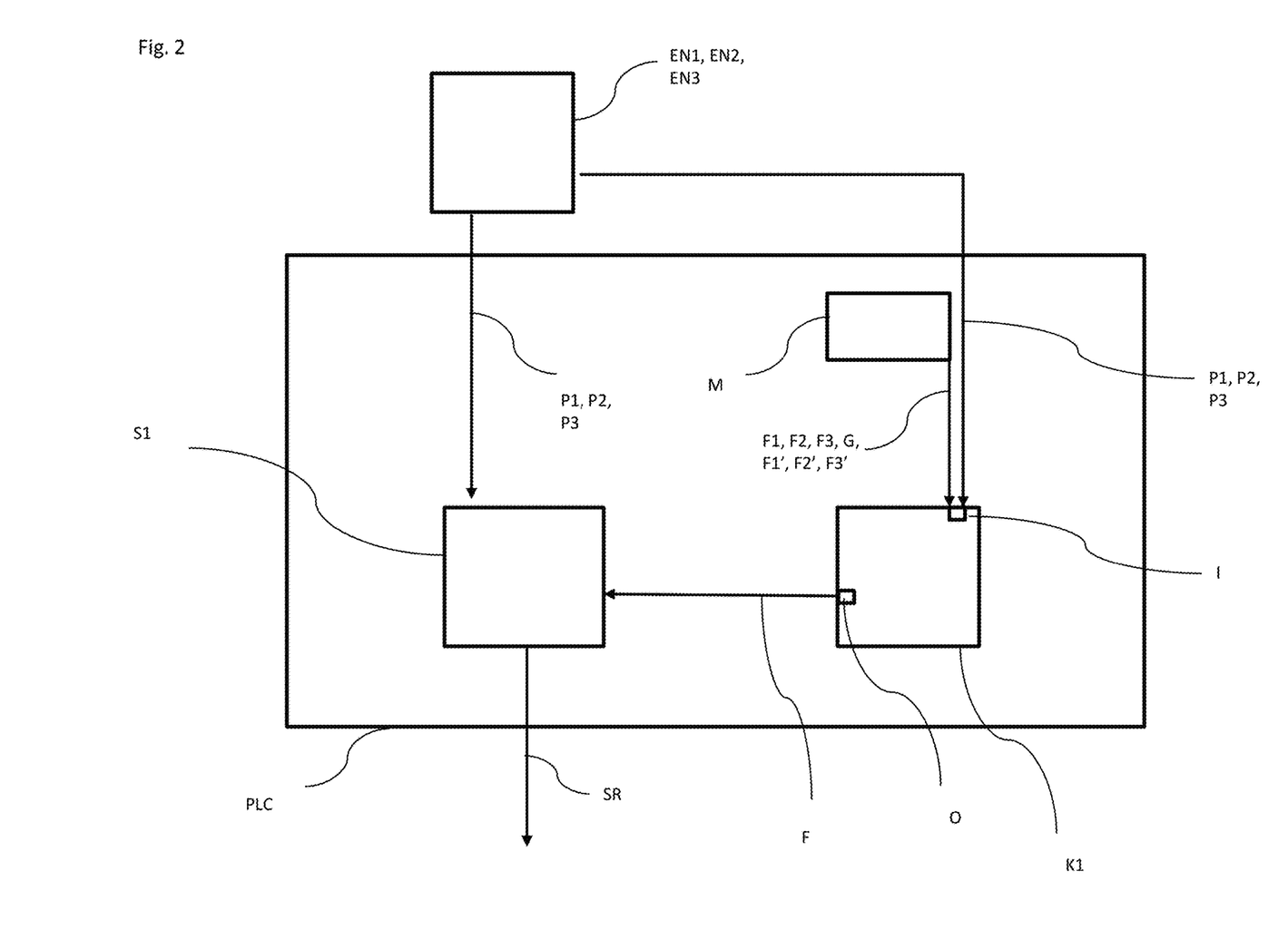
FIG. 2 depicts a schematic representation of a control device with a safety function block according to a second exemplary embodiment.

FIG. 2 depicts a schematic depiction of a control device PLC with a safety function block S1 and a compensation block K1 according to a second exemplary embodiment. The safety function block S1 is responsible for performing a safety function and monitors one or more variables as described in the examples above. The safety function block S1 is advantageously embodied as a software module. The safety function block S1 is responsible for initiating a safety reaction SR if an infringement of a variable to be monitored is detected, for example the reaching or exceeding of a limit value.

The safety function block S1 operates on the basis of position values P1, P2, P3 provided by sensors or transducers EN1, EN2, EN3 of the axes 1, 2, 3 that are involved. From the position values P1, P2, P3, the safety function ascertains the variable to be monitored or the variables to be monitored, such as for example Cartesian positions or speeds.

Additionally, the compensation block K1 provides at least one compensation value F that influences a variable of the safety function, for example a comparison variable of a variable to be monitored. By way of example, the compensation value F increases or reduces the limit values up to which the safety function does not trigger a safety reaction.

The compensation block K1 receives the values that it needs in order to calculate the compensation value F at the compensation input I. Firstly, these are the position values P1, P2, P3, e.g., the current axis values during operation. These are likewise provided by the sensors or transducers EN1, EN2, EN3. Secondly, the compensation block K1 also receives values from a memory area M, which have been stored for the specific application, at the input I. These are the geometric parameters G of the multi-axis kinematic system 100 and the error values F1, F2, F3 of the sensors EN1, EN2, EN3.

Additionally, error values F1', F2', F3' of the axes 1, 2, 3, for which allowance needs to be made during safety reactions on the basis of axial run-on distances, are provided from the memory M. The calculations of the compensation value F at the run time may then be performed according to one of the examples described above.

If for example position values that are erroneous, (for example, because run-on distances of individual axes when a stop process is initiated may lead to an infringement of safety zones on a Cartesian basis, or because transducer values are erroneous on the basis of limited resolution, are reported in the course of operation), safe operation without collisions is still made possible based on the use of the continually calculated compensation values for limit values that are set.

Figure 3:
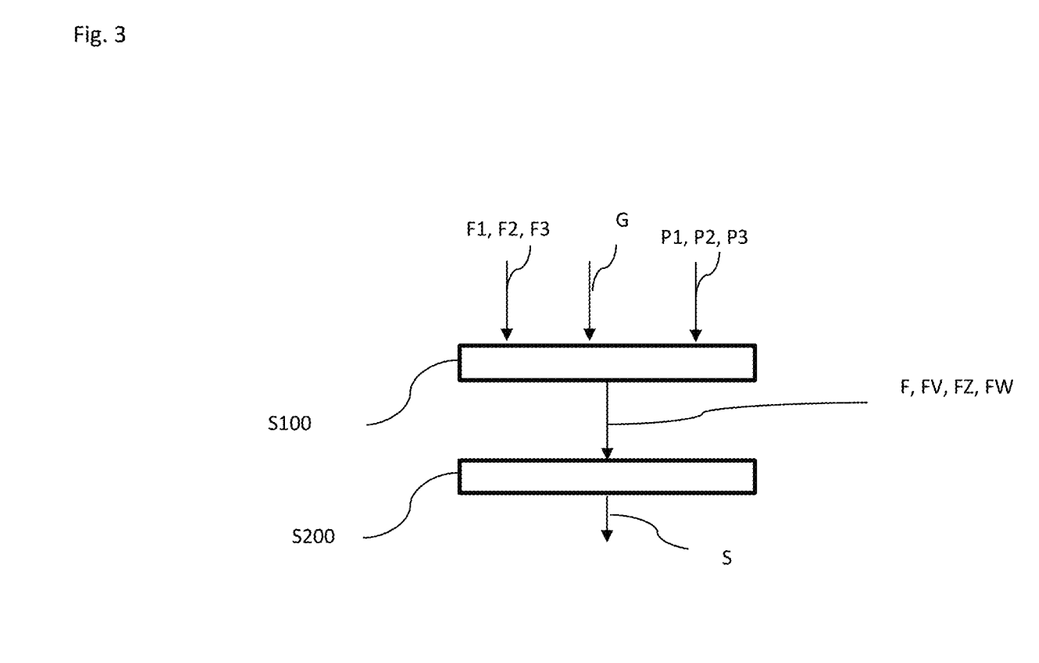
FIG. 3 depicts a schematic flowchart according to a third exemplary embodiment.

FIG. 3 uses a flowchart to illustrate a method according to a third exemplary embodiment. This involves the compensation value F being calculated, in a first act S100, during the operation of a multi-axis kinematic system, wherein the compensation value is output at the end of the calculation. Based on the compensation value F, safe operation of the multi-axis kinematic system is rendered possible in a second act S200. During operation, at least one safety function S is in operation. By way of example, the function "Safe speed monitoring" is activated, which predefines maximum speeds for individual axes and initiates a safety state if the maximum speed is exceeded. By way of example, the exceeding is indicated at an output or stopping of the kinematic system is initiated, a so-called STO.

Allowance is made for a speed, determined using sensors or transducers, of individual axes, or of a part of the multi-axis kinematic system whose speed results from the interaction of multiple axes, being erroneous. Positions detected at predefined times are used for the speed ascertainment. These positions are erroneous and accordingly the speed deduced therefrom is also erroneous.

The errors attached to the two items of position information are used to ascertain the compensation value F, here inter alia a speed error absolute value FV of the speed, using the methods of error propagation. The absolute value is just large enough for the worst case of errors adding up to be covered and at the same time excessively pessimistic estimation not to take place.

To again correctly ascertain the position errors attached to the part of the kinematic system that is monitored using the function "Safe speed", for example, the end effector, the position errors of all axes involved, or of the respective axis sensors thereof, are ascertained and then propagation algorithms are used to ascertain an error of the respective position. For this purpose, the maximum position errors of the axes involved are provided to the compensation program, which ascertains the compensation value during operation and at the run time, as maximum error values F1, F2, F3 from a memory.

Besides the position error based on the output value of the sensors, errors for the scanning of the sensors over time are also included. For every position detected at a time, a total position error absolute value FZ is therefore obtained. Allowance is accordingly made for respective total position errors in order to ascertain the speed error absolute value FV.

The total position error absolute value FZ may also be used for further activated safety functions, for example in order to estimate the position errors, which are critical for the zone monitoring and necessitate enlargements of the safety zones. For an additional activated safety function "Safe orientation", an angle error absolute value FW may additionally be output, which defines the cone within which the orientation of a tool or other part of the kinematic system may be expected in the worst case.

Besides the maximum errors F1, F2, F3, the geometric parameters G of the multi-axis kinematic system are also processed by the compensation program.

All of the details made available in this manner may now be used to provide the compensation values in a manner tailored to an individual kinematic system and the individual motion sequences thereof at the run time. In particular, a compensation value for a variable is output as the maximum error absolute value obtained at a time during operation of the multi-axis kinematic system.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for safely operating a multi-axis kinematic system by using a safety function, the safety function being based on respective positions of respective axes of the multi-axis kinematic system, the method comprising:
   calculating compensation values at a run time of a controller of the multi-axis kinematic system, wherein the calculating is performed based on an error value for each axis of the respective axes of the multi-axis kinematic system, geometric parameters of the multi-axis kinematic system, and current axis values of the multi-axis kinematic system, wherein a sensor resolution is used as a respective error value for each axis of the respective axes, and wherein each error value represents a maximum sensor error possible for a respective axis sensor; and
   operating the safety function based on the calculated compensation values.

2. The method of claim 1, wherein the safety function is dynamically adapted.

3. The method of claim 2, wherein the safety function is dynamically adapted by adapting variables of the safety function during the run time.

4. The method of claim 1, wherein the safety function is operated by using a comparison, which takes place at the run time, with compensation values ascertained in a configuration phase, and
   wherein a safety reaction is initiated when the calculated compensation values at the run time and the compensation values ascertained in the configuration phase are below respective stipulable deviation limit values.

5. The method of claim 4, wherein the respective error values and/or the geometric parameters are provided in the configuration phase at a time before the run time.

6. The method of claim 4, wherein the respective error values and/or the geometric parameters are provided or changed at the run time.

7. The method of claim 4, wherein the current axis values are obtained from trajectories to be travelled along by the multi-axis kinematic system, and during the run time for axis attitudes adopted at successive times as a result of the trajectories to be travelled along.

8. The method of claim 4, wherein the compensation values ascertained in the configuration phase are estimated or are ascertained during a test run.

9. The method of claim 1, wherein the respective error values and/or the geometric parameters are provided in a configuration phase at a time before the run time.

10. The method of claim 1, wherein the respective error values and/or the geometric parameters are provided or changed at the run time.

11. The method of claim 1, wherein the current axis values are obtained from trajectories to be travelled along by the multi-axis kinematic system, and during the run time for axis attitudes adopted at successive times as a result of the trajectories to be travelled along.

12. The method of claim 1, wherein compensation values ascertained in a configuration phase are estimated or are ascertained during a test run.

13. The method of claim 1, wherein the safety function comprises safe zone monitoring, a safe orientation, a safe Cartesian speed, or a combination thereof.

14. The method of claim 1, wherein one or more of angle absolute values, zone dimension absolute values, or speed absolute values, which are variable with the run time, are ascertained as compensation values.

15. The method of claim 1, wherein the safety function is further operated based on a timing error for scanning of respective axis sensors over time.

16. A non-transitory control device for safely operating a multi-axis kinematic system, having a safety function block, wherein the safety function block is configured to initiate safety reactions based on respective positions of respective axes of the multi-axis kinematic system, the non-transitory control device comprising:

a compensation block configured to calculate compensation values at a run time of a controller of the multi-axis kinematic system, wherein the compensation block has inputs for an error value for each axis of the respective axes of the multi-axis kinematic system, geometric parameters of the multi-axis kinematic system, and current axis values of the multi-axis kinematic system, wherein a sensor resolution is used as a respective error value for each axis of the respective axes, and wherein each error value represents a maximum sensor error possible for a respective axis sensor, wherein the compensation block has outputs for the compensation values, and wherein the safety function block is configured to initiate the safety reactions based on the outputs for the compensation values.

* * * * *